(12) United States Patent
Yoo et al.

(10) Patent No.: US 11,750,395 B2
(45) Date of Patent: Sep. 5, 2023

(54) SYSTEM AND METHOD FOR BLOCKCHAIN-BASED MULTI-FACTOR SECURITY AUTHENTICATION BETWEEN MOBILE TERMINAL AND IOT DEVICE

(71) Applicant: ICNCAST CO., LTD., Seoul (KR)

(72) Inventors: Yong-Hwan Yoo, Anyang-si (KR); Bonggyeol Choi, Seoul (KR)

(73) Assignee: ICNCAST CO., LTD, Seoul (KR)

( * ) Notice: Subject to any disclaimer, the term of this patent is extended or adjusted under 35 U.S.C. 154(b) by 376 days.

(21) Appl. No.: 16/972,539

(22) PCT Filed: Sep. 3, 2018

(86) PCT No.: PCT/KR2018/010193
§ 371 (c)(1),
(2) Date: Dec. 4, 2020

(87) PCT Pub. No.: WO2020/050424
PCT Pub. Date: Mar. 12, 2020

(65) Prior Publication Data
US 2021/0250177 A1    Aug. 12, 2021

(51) Int. Cl.
*G06F 21/00* (2013.01)
*H04L 9/32* (2006.01)
(Continued)

(52) U.S. Cl.
CPC ............ *H04L 9/3239* (2013.01); *G16Y 30/10* (2020.01); *G16Y 40/35* (2020.01); *G16Y 40/50* (2020.01); *H04L 9/0869* (2013.01); *H04L 9/50* (2022.05)

(58) Field of Classification Search
None
See application file for complete search history.

(56) References Cited

U.S. PATENT DOCUMENTS 10,181,948 B1 * 1/2019 Nenov ................ G06F 9/44505
10,588,175 B1 * 3/2020 Koeppel ................ G06F 16/27
(Continued)

FOREIGN PATENT DOCUMENTS

| KR | 10-2006-0031681 A | 4/2006 |
| KR | 10-2014-0045829 A | 4/2014 |

(Continued)

OTHER PUBLICATIONS

International Search Report dated May 24, 2019, issued to International Application No. PCT/KR2018/010193.

*Primary Examiner* — Eleni A Shiferaw
*Assistant Examiner* — Hassan A Hussein
(74) *Attorney, Agent, or Firm* — Stein IP, LLC

(57) ABSTRACT

Provided is a system for blockchain-based multi-factor security authentication between a mobile terminal and an IoT device, the system including: the IoT device; a user terminal remotely controlling operation of the IoT device; and an authentication server approving control of the IoT device by the user terminal, wherein the authentication server has: a first function of recording information related to a registration hash value in a blockchain; a second function of receiving an authentication hash value generated by the user terminal when approval for control of the IoT device is requested, and determining validity of the authentication hash value by using the information related to the registration hash value recorded in the blockchain; and a third function of approving control of the IoT device by the user terminal when the authentication hash value has validity as a result of the determination.

9 Claims, 7 Drawing Sheets

(51) Int. Cl.
  *G16Y 30/10* (2020.01)
  *G16Y 40/50* (2020.01)
  *G16Y 40/35* (2020.01)
  *H04L 9/08* (2006.01)
  *H04L 9/00* (2022.01)

(56) References Cited

U.S. PATENT DOCUMENTS

| | | | | |
|---|---|---|---|---|
| 10,783,260 | B2* | 9/2020 | Uhr | G06F 21/33 |
| 10,797,878 | B2* | 10/2020 | Cleaver | H04L 9/0637 |
| 10,826,703 | B1* | 11/2020 | Shipley | G06F 16/1805 |
| 11,392,947 | B1* | 7/2022 | Prasad | G06Q 20/40155 |
| 11,575,968 | B1* | 2/2023 | Barlik | H04N 21/278 |
| 2016/0112434 | A1* | 4/2016 | Chung | H04L 63/0807 726/4 |
| 2017/0206523 | A1* | 7/2017 | Goeringer | G06F 21/45 |
| 2017/0222829 | A1* | 8/2017 | Kessler | H04L 12/40058 |
| 2018/0330348 | A1* | 11/2018 | Uhr | G06Q 20/36 |
| 2019/0012480 | A1* | 1/2019 | Thorwirth | H04L 63/0421 |
| 2019/0013948 | A1* | 1/2019 | Mercuri | G06F 16/27 |
| 2019/0036906 | A1* | 1/2019 | Biyani | H04L 63/20 |
| 2019/0052467 | A1* | 2/2019 | Bettger | H04L 9/088 |
| 2019/0065709 | A1* | 2/2019 | Salomon | G06F 8/71 |
| 2019/0158470 | A1* | 5/2019 | Wright | G06F 21/602 |
| 2019/0166101 | A1* | 5/2019 | Ramos | G06Q 50/265 |
| 2019/0207957 | A1* | 7/2019 | Espinosa | H04L 63/1425 |
| 2019/0268332 | A1* | 8/2019 | Wang | G06F 21/32 |
| 2019/0297113 | A1* | 9/2019 | Yang | H04L 63/1408 |
| 2019/0349354 | A1* | 11/2019 | Baumgarte | H04L 63/0853 |
| 2019/0362101 | A1* | 11/2019 | Fisse | G06F 16/951 |
| 2020/0060007 | A1* | 2/2020 | Harrison | G06T 7/90 |
| 2020/0064783 | A1* | 2/2020 | Tran | F24F 11/72 |
| 2020/0067708 | A1* | 2/2020 | Subba | H04L 9/0861 |
| 2020/0103894 | A1* | 4/2020 | Celia | G05B 23/0264 |
| 2020/0133257 | A1* | 4/2020 | Celia | G05B 19/4183 |
| 2020/0213306 | A1* | 7/2020 | Thomsen | H04L 9/0637 |
| 2020/0219097 | A1* | 7/2020 | Chan | H04L 9/0662 |
| 2020/0225655 | A1* | 7/2020 | Cella | G05B 19/41875 |
| 2020/0344073 | A1* | 10/2020 | Dix | H04L 41/0803 |
| 2021/0250177 | A1* | 8/2021 | Yoo | G16Y 30/10 |
| 2022/0366494 | A1* | 11/2022 | Celia | G06Q 30/0201 |

FOREIGN PATENT DOCUMENTS

| | | |
|---|---|---|
| KR | 10-2015-0035971 A | 4/2015 |
| KR | 10-2016-0121775 A | 10/2016 |
| KR | 10-1800737 B1 | 11/2017 |
| KR | 10-1829040 B1 | 2/2018 |
| KR | 10-2018-0036555 A | 4/2018 |
| KR | 10-2018-0054497 A | 5/2018 |

\* cited by examiner

FIG. 7

```
char *rec_odd;
char *rec_even;
 r_len = strlen(char *rec_origin);
int i = 0;

while(i < r_len)
     {
        if i%2 == 0
           rec_even = rec_even + re_origin[i];
        else
           rec_odd = rec_odd + re_origin[i];
        i++;
     }
```

SYSTEM AND METHOD FOR BLOCKCHAIN-BASED MULTI-FACTOR SECURITY AUTHENTICATION BETWEEN MOBILE TERMINAL AND IOT DEVICE

CROSS-REFERENCE TO RELATED APPLICATIONS

This application is a national stage of International Application No. PCT/KR2018/010193, filed Sep. 3, 2018, in the Korean Intellectual Property Office, the disclosure of which is incorporated herein by reference.

BACKGROUND OF THE INVENTION

Field of the Invention

The present disclosure relates to an IoT security system and security method. More particularly, the present disclosure relates to a system and a method for blockchain-based multi-factor security authentication between a mobile terminal and an IoT device, wherein the system and the method are capable of authenticating validity of a user terminal on the basis of a blockchain when it is attempted to perform remote control of the IoT device through the user terminal, and are capable of preventing hacking related to remote control of the IoT device.

Description of the Related Art

In general, existing authentication techniques for controlling an IoT device by using a mobile terminal have primarily used authentication information, such as ID, password, and the like, and have secondarily used security card or bio-information, such as a fingerprint, an iris, and the like. However, there is a problem that when such authentication-related information is hacked, the authentication information leaks out and is used without permission or a security checking program logic is incapacitated through forgery/falsification of the program.

As described above, when the authentication-related information is hacked, personal privacy, corporate secrets, or the like leak out due to the control of the IoT by a third party without permission, resulting in damage to property and human life.

For example, when an authentication server for approving remote control of IoT, or a mobile terminal is hacked, a security authentication key, the physical code of the mobile terminal, and the like are stolen and used without permission and a security procedure may be incapacitated through forgery/falsification of the program. In addition, in a process of authentication and control between the mobile terminal and the IoT device, communication packets may be exposed to sniffing, spoofing, manipulation of packets, or the like.

In the meantime, in the related art, an authentication device, such as an authentication card, a USB, and the like, has been used for authentication of the mobile terminal in order to prevent the authentication information from being hacked. However, in the case of using the authentication device, such as the authentication card, the USB, or the like, the authentication device is likely to be lost and stolen, it is necessary to purchase the authentication device, and it is inconvenient to carry the authentication device.

In addition, there is a problem of security limitations in controlling IoT devices by the mobile terminal because an authentication process differs between manufacturers of IoT devices.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent Application Publication No. 10-2015-0035971 (published Apr. 7, 2015);
(Patent Document 2) Korean Patent Application Publication No. 10-2014-0045829 (published Apr. 17, 2014).

SUMMARY OF THE INVENTION

The present disclosure is directed to providing a system and a method for blockchain-based multi-factor security authentication between a mobile terminal and an IoT device, the system and the method being capable of blocking, even when authentication-related information is hacked, the information from being used without permission; not requiring an authentication device, such as an authentication card or a USB; and strengthening security and integrity of a security authentication process between a user terminal and an IoT device.

In addition, the present disclosure is directed to providing a system and a method for blockchain-based mufti-factor security authentication between a mobile terminal and an IoT device, the system and method being capable of fundamentally preventing personal information from being hacked for the control of IoT without permission, or the like.

According to the present disclosure, there is provided a system and a method for blockchain-based multi-factor security authentication between a mobile terminal and an IoT device, the system and the method being based on the IoT device; a user terminal remotely controlling operation of the IoT device; and an authentication server approving control of the IoT device by the user terminal.

In the present disclosure, the authentication server may have: a first function of recording information related to a registration hash value in a blockchain; a second function of receiving an authentication hash value generated by the user terminal when approval for control of the IoT device is requested, and determining validity of the authentication hash value by using the information related to the registration hash value recorded in the blockchain; and a third function of approving control of the IoT device by the user terminal when the authentication hash value has validity as a result of the determination.

In the present disclosure, the information related to the registration hash value may be information on a first hash, information on a second hash, or information on a hash (hereinafter, referred to as a mix hash) that is a mix of the first hash and the second hash.

The first hash may be composed of at least two pieces of identification information among multiple pieces of identification information (hereinafter, referred to as first identification information) unique to the IoT device.

The second hash may be composed of at least two pieces of identification information among multiple pieces of identification information (hereinafter, referred to as second identification information) unique to the user terminal.

In the present disclosure, the authentication server may further have a fourth function of receiving the first identification information and the second identification information and storing the first identification information and the second identification information in a DB for management.

In this case, the information related to the registration hash value may be information (hereinafter, referred to as first combination information) on a combination method of the first identification information of the first hash, information (hereinafter, referred to as second combination information) on a combination method of the second identification information of the second hash, or information (hereinafter, referred to as mixed combination information) on a combination method of the first and the second identification information of the mix hash.

The second function of the authentication server may have: a 2-1 function of reading, when approval for control of the IoT device is requested, the first combination information, the second combination information, or the mixed combination information that are recorded in the blockchain; a 2-2 function of generating the registration hash value by combining the first identification information and the second identification information stored in the DB for management depending on the combination method corresponding to the combination information read according to the 2-1 function; and a 2-3 function of comparing the authentication hash value and the registration hash value generated according to the 2-2 function so as to determine the validity.

In addition, the third function of the authentication server may include a function of approving control of the IoT device by the user terminal when the authentication hash value is the same as the registration hash value as a result of the comparison.

According to the present disclosure, in the system and the method for blockchain-based multi-factor security authentication between the mobile terminal and the IoT device, the first information for authenticating the validity of the user terminal is recorded and stored on the blockchain and the second information is stored and managed in the authentication server. In addition, when the user terminal makes a request for the control of the IoT device, the first information and the second information are used together to verify whether the user terminal is valid. Accordingly, in order for an invalid user to control the IoT device without permission, it is necessary to hack both of the first information (that is, the blockchain) and the second information (that is, the authentication server), In fact, it is impossible to control the IoT device without permission.

In addition, according to the present disclosure, in the system and the method for blockchain-based multi-factor security authentication between a mobile terminal and an IoT device, an authentication device, such as an authentication card or a USB, is not required, so that the risk of loss of the authentication device and inconvenience in use are avoid.

Accordingly, hacking related to the remote control of IoT is fundamentally prevented, so that the security of the IoT device is greatly improved and user convenience is increased.

BRIEF DESCRIPTION OF THE DRAWINGS

The above and other objectives, features, and other advantages of the present disclosure will be more clearly understood from the following detailed description when taken in conjunction With the accompanying drawings, in which:

FIG. 7 is a code illustrating an algorithm for binary splitting a record on a per-byte basis, in a process of preventing hacking into personal information according to the present disclosure.

DESCRIPTION OF THE REFERENCE NUMERALS IN THE DRAWINGS

10: User terminal
20: IoT device
30: Authentication server
40: Blockchain

DETAILED DESCRIPTION OF THE INVENTION

The terms used in the specification are merely used to describe particular embodiments, and are not intended to limit the present disclosure. As used herein, the singular forms "a", "an", and "the" are intended to include the plural forms as well, unless the context clearly indicates otherwise. In the specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In addition, in the specification, when an element is described as being "coupled" or "connected" to another element, unless the context clearly indicates otherwise, the former element may be directly coupled or directly connected to the latter element or intervening elements may be present therebetween.

In addition, in the specification, terms "first", "second", etc. used in the specification can be used to describe various elements, but the elements are not to be construed as being limited to the terms. The terms are only used to differentiate one element from other elements.

Hereinafter, preferred embodiments, advantages, and features of the present disclosure will be described in detail with reference to the accompanying drawings.

Figure 1:
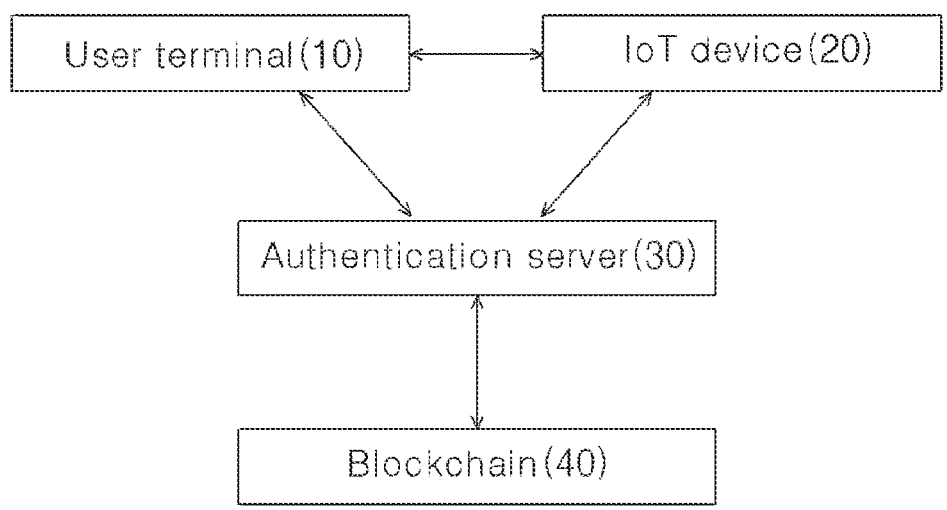
FIG. 1 is a block diagram illustrating a system for blockchain-based multi-factor security authentication between a mobile terminal and an IoT device according to the present disclosure.

FIG. 1 is a block diagram illustrating a system for blockchain-based multi-factor security authentication between a mobile terminal and an IoT device according to the present disclosure.

Referring to FIG. 1, the system for blockchain-based multi-factor security authentication between a mobile terminal and an IoT device schematically includes a user terminal 10, an IoT device 20, an authentication server 30, and a blockchain 40.

In the present disclosure, the IoT device 20 refers to an Internet of Things (IoT) electrical or electronic device of which operation is controlled through IoT communication with the user terminal 10 over a wired/wireless Internet, such as a voice network, a data network, W-Fi, or the like.

Herein, the "IoT communication" refers to a form evolved from ubiquitous sensor network (USN), and machine to machine (M2M). That is, in the case where the main purpose of M2M is communication between a communication device (end device) and a person, the range of objects is expanded and IoT refers to a technology that enables the objects to communicate with a person. Examples of the objects may include security devices, smart home appliances, heating and cooling devices, CCTV, lighting devices, smart factories, smart farms, thermostats, and the like.

The IoT device 20 may correspond to various in-home electronic devices equipped with a communication function, for example, a refrigerator, a smart TV, a heater, and the like. The IoT device 20 may correspond to a home automation control device that controls various in-home devices connected through home automation.

In addition, the IoT device 20 is able to communicate with the user terminal 10 over a wired/wireless Internet, and is able to receive remote control commands transmitted from the user terminal 10 authenticated by the authentication server 30 so as to perform operations corresponding to the commands.

In the present disclosure, the user terminal 10 refers to a terminal that remotely controls the IoT device 20 by communicating with the IoT device 20 over the wired/wireless Internet. For example, the user terminal 10 may be a mobile terminal, such as a smartphone, a tablet PC, a wearable device, and a PDA. Further, the user terminal 10 may be a desktop computer, a notebook computer, or the like.

The user terminal 10 obtains approval for authority to control the IoT device 20 through an authentication procedure performed by the authentication server 30 and then remotely controls the IoT device 20.

In the meantime, an application program (hereinafter, referred to as the "IoT App") that runs in association with the IoT device 20 or the authentication server 30 may be installed on the user terminal 10. In this case, when the user terminal 10 is registered/changed/added or when approval for control of the IoT device 20 is requested, the user terminal 10 runs the IoT app installed thereon and logs in by entering use's ID/password, thereby being in conjunction with the IoT device 20 or the authentication server 30. Hence, a process for registering/changing/adding the user terminal 10 and for approving control of the IoT device 20 proceeds. Herein, user's ID and password may be generated when the IoT app is installed or the user applies for membership.

In addition, user authentication when the user applies for membership is generally verifying the identity of the other party between the parties to transaction (identity validation). During one session, identity claim of the other party is validated between the parties to transaction (people, processes, clients, servers, devices, or the like). Identification and authentication are performed for each user (personal identity).

In the present disclosure, the user has the user terminal 10 authenticated through the authentication server 30 or a third-party authentication API within the authentication server 30 and accessing the server for the first time. A method for user authentication may use user's mobile phone number, resident registration number, various identification numbers, biometric information, or the like.

In the present disclosure, the authentication server 30 registers the IoT device 20 that is to be remotely controlled by the user's mobile terminal. When there is a request for remote control of the IoT device 20 from the user terminal 10, the authentication server 30 authenticates the validity of the user terminal 10. When the validity is authenticated, the authentication server 30 approves the remote control of the IoT device by the user terminal 10.

For reference, the term "registration" referred to in the present disclosure includes generating, recording, and storing an authentication means (that is, a registration hash value) that is required for approval for the remote control of the IoT device 20 by the user terminal 10. Furthermore, the term "registration" in the present disclosure may further include inputting and storing, in the authentication server 30, information related to the user terminal 10 and information related to the IoT device 20, which is the target of control by the user terminal 10.

Hereinafter, detailed functions of the authentication server 30 will be described. Herein, the functions of the authentication server 30 include functions of approving a request for control of the IoT device 20 by the user terminal 10, and of preventing hacking into personal information.

According to a first embodiment, the authentication server 30 has a function of recording information related to a registration hash value in the blockchain 40.

The "information related to the registration hash value" is information on a first hash, information on a second hash, or intonation on a hash (hereinafter, referred to as a first mix hash) that is a mix of the first hash and the second hash.

As an extended embodiment, the "information related to the registration hash value" may be information on a first hash, a second hash, or a third hash, or may be intonation on a hash (hereinafter, referred to as a second mix hash) that is a mix of at least two among the first hash, the second hash, and the third hash.

Specifically, the "information related to the registration hash value" may include: information (hereinafter, referred to as first combination intonation) on a combination method of first identification information of the first hash, which will be described later; information (hereinafter, referred to as second combination information) on a combination method of second identification information of the second hash, which will be described later; information (hereinafter, referred to as third combination information) on a combination method of third identification information of the third hash, which will be described later; or information (hereinafter, referred to as mixed combination information) on a combination method of the first, the second, and the third identification intonation of the first and the second mix hash.

The first hash is composed of at least two pieces of identification intonation among multiple pieces of identification information (hereinafter, referred to as first identification information) unique to the IoT device 20.

The first identification information includes information related to the physical code, information related to an operating system (OS), and information related to an app of the IoT device 20. The first identification information may further include communication packet information and manufacturer information.

Therefore, the first hash may be a combination of at least two pieces of information among the information related to the physical code, the information related to the operating system (OS), the information related to the app, the communication packet information, and the manufacturer information of the IoT device 20.

Specifically, the information related to the physical code of the first identification information includes a serial number, CPU information, a model number of the IoT device 20, and the like.

The information related to the operating system (OS) of the first identification information includes version information of the operating system (OS) installed on the IoT device 20, the type of the OS, and the like.

The information related to the app of the first identification information includes version information of the application installed on the IoT device 20, checksum information, and the like. Herein, the app installed on the IoT device 20 may be the above-described IoT app.

The communication packet information of the first identification information may include access path information of the IoT device 20. The manufacturer information may include information related to the manufacturer of the IoT device 20.

For reference, in the first embodiment, the information related to the registration hash value may be registered by the user terminal 10 by accessing the authentication server 30, or may be generated by the authentication server 30 and provided to the user terminal 10 that attempts to register.

The second hash is composed of at least two pieces of identification information among multiple pieces of identification information (hereinafter, referred to as second identification information) unique to the user terminal 10.

The second identification information includes information related to the physical code, inform-ration related to an operating system (OS), and information related to an app of the user terminal 10. The second identification information may further include communication packet information and manufacturer information.

Therefore, the second hash may be a combination of at least two pieces of information among the information related to the physical code, the information related to the operating system (OS), the information related to the app, the communication packet information, and the manufacturer information of the user terminal 10.

Specifically, the information related to the physical code of the second identification information includes a mobile communication number, a serial number, a model number, USIM information, MAC address information, the International Mobile Equipment Identity (IMEI) of the user terminal 10, and the like.

The information related to the operating system (OS) of the second identification information includes version information of the operating system (OS) installed on the user terminal 10, the type of the OS, and the like.

The information related to the app of the second identification information includes version information of the application installed on the user terminal 10, checksum information, and the like. Herein, the app installed on the user terminal 10 may be the above-described IoT app.

The communication packet information of the second identification information may include access path information of the user terminal 10. The manufacturer information may include information related to the manufacturer of the user terminal 10.

The third hash may be composed of at least two pieces of identification information among multiple pieces of identification information (hereinafter, referred to as "Third identification information") unique to the user who owns the user terminal 10.

The third identification information may include a phone number, a name, a date of birth, an access time, an access IP, and GPS information.

Furthermore, the third identification information may further include identification information of a wired/wireless network device, other servers, or the like provided between the user terminal 10 and the IoT device 20.

According to an extended embodiment, the information related to the registration hash value may be information on a hash that is a mix of a random number value and the first hash, the second hash, the third hash, or the mix hash. In this case, the random number value may be generated by the authentication server 30 or the IoT device 20 and may be provided to the user terminal 10.

According to a second embodiment, the authentication server 30 is configured to record a hash value itself in the blockchain 40 as the information related to the registration hash value when the user terminal 10 attempts to register.

That is, in the first embodiment, it is configured to record, in the blockchain 40, not a hash value itself, but the "combination method" of the first identification information and (or) second identification information for generating a particular hash value (that is, the registration hash value). However, in the second embodiment, an actual value corresponding to the registration hash value is recorded in the blockchain 40.

The "combination method" in the first embodiment will be described as follows. For example, it is presumed that the registration hash value is a value composed of the OS intonation "A" and the app version information "B" of the first identification information, and the physical code "C" and the OS information "D" of the second identification information.

In this case, in the second embodiment, the "registration hash value" to be recorded in the blockchain 40 is a value generated as a combination of "A, B, C, D" that are actual values corresponding to respective items of identification information constituting the registration hash value.

However, in the first embodiment, the "information related to the registration hash value" to be recorded in the blockchain 40 refers to information on items of identification information required in generating the registration hash value, That is, the "information related to the registration hash value" refers not to the actual value of each of pieces of the identification information constituting the registration hash value, but to an item of the identification information, which is the superordinate concept of the value. Therefore, in the above example, an OS information item that is a first item of the first identification information; an app version information item that is a second item of the first identification information; a physical code item that is a first item of the second identification information; and an OS information item that is a second item of the second identification information correspond to the "information related to the registration hash value".

Therefore, according to the second embodiment, the registration hash value may be a value generated by using the first hash or second hash, or a value generated by combining the first hash and the second hash.

As an extended embodiment, the registration hash value may be a value generated by using the first hash, the second hash, or the third hash, or may be a value generated by combining at least two among the first hash, the second hash, and the third hash.

That is, a type of hash and the number of the combinations for generating the registration hash value may increase in proportional to the strength of security.

As another extended embodiment, the registration hash value may be a value generated by further combining a random number value. In this case, when the user terminal 10 intends to generate a registration hash value for attempting to register or requesting approval for control of the IoT device 20, the authentication server 30 generates a random number value and provides the value to the user terminal 10.

As another embodiment, when the user terminal 10 intends to generate a registration hash value, the IoT device 20 generates a random number value and provides the value to the user terminal 10.

In the second embodiment, when the user terminal 10 generates and registers a registration hash value, the registration hash value is transmitted to the authentication server 30, the authentication server 30 receives the registration hash value, and the authentication server 30 records and stores the registration hash value in the blockchain 40. In the meantime, the registration hash value generated by the user terminal 10 may be directly transmitted to the authentication server 30 by the user terminal 10. Alternatively, the registration hash value may be provided to the authentication server 30 via the IoT device 20. That is, when the user terminal 10 transmits the registration hash value to the IoT device, the IoT device 20 receives the registration hash value and provides the registration hash value to the authentication server 30.

In the present disclosure, the blockchain 40 is a decentralized electronic ledger or database platform. A digital record or transaction on a thread is called a block, through which a published or controlled user set is able to participate in the electronic ledger. Each timestamp is applied and an immutable record of a transaction associated with the previous one is generated.

The authentication server 30 corresponds to one participant in a community, namely, a user set, connected through the blockchain 40.

The blockchain 40 has a structure that processes a transaction through a timestamp server based on a decentralized network. The blockchain 40 is constructed in a distributed data structure in which a number of blocks having timestamp records are connected. Each block is identified through a hash value, and has a structure that refers to the previous block.

Specifically, the blockchain 40 is schematically composed of a block header, a transaction, and the like. The block header is composed of a digital signature and a hash value of the previous block header, a timestamp and a hash value of the current block, and the like. Accordingly, a first hash value recorded in a first block is contained as the "previous-block hash value" in a second block that is connected to the first block through a chain.

In the present disclosure, the information related to the registration hash value or the registration hash value is recorded in the block header of the blockchain 40. For an index value, the blockchain 40 may be constructed by adding a user code (for example, a serial number) to the hash value. According to an embodiment, the user code may be placed in front of the hash value.

Therefore, the date and time when the first generated and registered hash value (that is, the first registration hash value) is recorded in the blockchain 40 correspond to the timestamp of the genesis block of the blockchain 40.

According to the first embodiment, the authentication server 30 has a function (hereinafter, referred to as a "validity determination function") of receiving, when the authentication server 30 receives a request for approval for control of the IoT device 20, an authentication hash value generated by the user terminal 10 and of determining the validity of the authentication hash value by using the information related to the registration hash value recorded in the blockchain 40. In addition, the authentication server further has a function of approving the remote control of the IoT device 20 by the user terminal 10 when the authentication hash value has the validity as a result of the determination.

According to the first embodiment, the authentication server 30 further has a function of receiving at least two pieces of identification information among the first identification information, the second identification information, and the third identification information described above and storing the received information in a DB for management.

The validity determination function of the authentication server 30 will be described in detail as follows.

When approval or control of the IoT device 20 is requested, the authentication server 30 reads information on a combination method recorded in the blockchain 40. Herein, the information on the combination method recorded in the blockchain 40 is information on the "identification information combination method" determined in the registration process performed by the user terminal 10. The information on the combination method may be any one among the first combination information, the second combination information, the third combination information, or the mixed combination information described above.

In addition, according to the combination method corresponding to the information on the combination method read from the blockchain 40, the authentication server 30 combines the first identification information, the second identification information, and (or) the third identification information that are stored in the DB for management in connection with the user terminal 10 and the IoT device 20, thereby generating the registration hash value.

In addition, the authentication server 30 compares the registration hash value with an authentication hash value transmitted from the user terminal 10 and determines the validity of the authentication hash value (that is, the validity of the user terminal 10).

As a result of comparison between the registration hash value and the authentication hash value, when the authentication hash value is the same as the registration hash value, the authentication server 30 approves remote control of the IoT device 20 by the user terminal 10.

That is, the authentication hash value of the present disclosure is an authentication means for determining the validity of the user terminal 10 that requests approval for control of the IoT device 20. When the user terminal 10 is a valid user terminal, the user terminal 10 generates a hash value (that is, an authentication hash value) that is the same as the registration hash value registered in the authentication server 30, and transmits the hash value to the authentication server 30.

When the user terminal 10 is an invalid user terminal, the user terminal 10 is unable to generate a hash value (that is, an authentication hash value) the same as the registration hash value, and is eventually unable to obtain approval for control of the IoT device 20.

Therefore, the authentication hash value is a value generated by using the same identification information as the registration hash value. That is, the authentication hash value may be a value generated by using a first hash, a second hash, or a third hash, or may be a value generated by combining at least two among the first hash, the second hash, and the third hash.

Similarly to the registration hash value, the first hash of the authentication hash value is a combination of at least two pieces of first identification information among multiple pieces of first identification information unique to the IoT device 20. The second hash is a combination of at least two pieces of second identification information among multiple pieces of second identification information unique to the user terminal 10. The third hash is a combination of at least two pieces of third identification information among multiple pieces of third identification information unique to the user who owns the user terminal 10. Regarding the authentication hash value, detailed formations of first, second, and third identification information are the same as those for the registration hash value.

In the meantime, the authentication hash value generated by the user terminal 10 may be directly transmitted to the authentication server 30 by the user terminal 10. Alternatively, the authentication hash value may be provided to the authentication server 30 via the IoT device 20. That is, when the user terminal 10 transmits the authentication hash value to the IoT device, the IoT device 20 receives the authentication hash value and provides the authentication hash value to the authentication server 30.

According to the second embodiment, when approval for control of the IoT device 20 is requested, the authentication server 30 receives an authentication hash value generated by the user terminal 10 and compares the value with the registration hash value recorded in the blockchain 40. As a result of the comparison, when the authentication hash value is the same as the registration hash value recorded in the blockchain 40, the authentication server 30 approves control of the IoT device 20 by the user terminal 10.

According to the above-described first embodiment or second embodiment, when the request for control of the IoT device 20 by the user terminal 10 is approved, the authentication server 30 transmits a control permission message to the user terminal 10 and transmits a request for control to the IoT device 20.

Then, an encryption communication channel between the IoT device 20 and the user terminal 10 is established so that intercommunication is enabled.

As a result of comparison between the authentication hash value and the registration hash value, when the authentication hash value is different from the registration hash value, the authentication server 30 transmits a control disapproval message to the user terminal 10 and terminates communication.

In the present disclosure, for security when transmitting and receiving information from the user terminal 10, and for the security of the IoT app (that is, for preventing hacking and forgery and falsification), the authentication server 30 may be configured to further perform the following function.

The authentication server 30 may issue a new session key when the user terminal 10 logs into the IoT app, or may periodically issue a new session key to the IoT device 20 that is the target of remote control by the user terminal 10. Afterward, when the user terminal 10 attempts to control the IoT device 20, the most recently issued session key is used to perform communication for transmitting and receiving information between the user terminal 10 and the authentication server 30. Herein, the information transmitted and received between the user terminal 10 and the authentication server 30 may be, for example, the first, the second, and the third identification information, the registration hash value, the authentication hash value, and the like.

In the meantime, in the case where the registration hash value and the authentication hash value are generated by further combining a random number value, the authentication server 30 receives an integrity verification key of the IoT app from the user terminal 10, and uses the integrity verification key to verify whether the program of the IoT app is falsified. As a result of the verification, when the IoT app is not falsified, the authentication server 30 provides the random number value to the user terminal 10. The integrity verification key is a key value generated by using the version information of the IoT app or the checksum information of the source code.

In the present disclosure, the system for blockchain-based multi-factor security authentication between the mobile terminal and the IoT device has been described taking one user terminal 10 as an example. However, the system may also be configured to register multiple user terminals, and enable the multiple user terminals to request approval for control of the same IoT device 20 and to control the IoT device 20.

For example, when a first user terminal registers and stores related information in the blockchain 40 for controlling a first IoT device, a second user terminal, a third user terminal, and an N-th user terminal also register information related to the corresponding user terminals in the blockchain 40 according to the above-described same method, and then proceed to make a request for control and approval for control of the first IoT device through the authentication process of the authentication server 30.

In this case, according to the authorities of the user terminals 10 to control the IoT device 20, the authentication server 30 divides the user terminals 10 into a master and a family for registration.

In addition, the authentication server 30 requests approval from the user terminal divided as the master when the user terminal divided as the family attempts to register, or authorizes registration of the user terminal divided as the family when the approval is obtained.

According to an embodiment, the authentication server 30 may divide the user terminals into a master and a family for registration according to the authorities to control the first IoT device. In this case, when it is intended to register the user terminal (for example, a second, a third, . . . , an N-th user terminal) divided as the family, approval from the user terminal (for example, a first user terminal) divided as the master is required in order to fulfill the registration and a request/approval for control of the first IoT device.

In the meantime, when it is intended to change the registered user terminal 10, the registered user terminal 10 requests the authentication server 30 for change of the user terminal. In this case, when the registered user terminal 10 generates and transmits an to authentication server 30, the authentication server 30 receives the authentication hash value and compares the value with the registration hash value recorded in the blockchain 40. As a result of the comparison, when the authentication hash value is the same as the registration hash value, a task of changing the registered user terminal 10 to another user terminal is approved. Herein, changing the registered user terminal may include changing the user terminal corresponding to the above-described master.

In the present disclosure, the authentication server 30 receives information related to the user terminal 10 and to an IoT device that is the target of control by the user terminal 10 and stores the information in an authentication servers DB for management. Such information corresponds to the attribute of the above-described registration hash value. Therefore, when such personal information is hacked, hacking into IoT remote control (that is, incorrect approval to an invalid user terminal) may occur, so a method to prevent this must be established.

Figure 6:
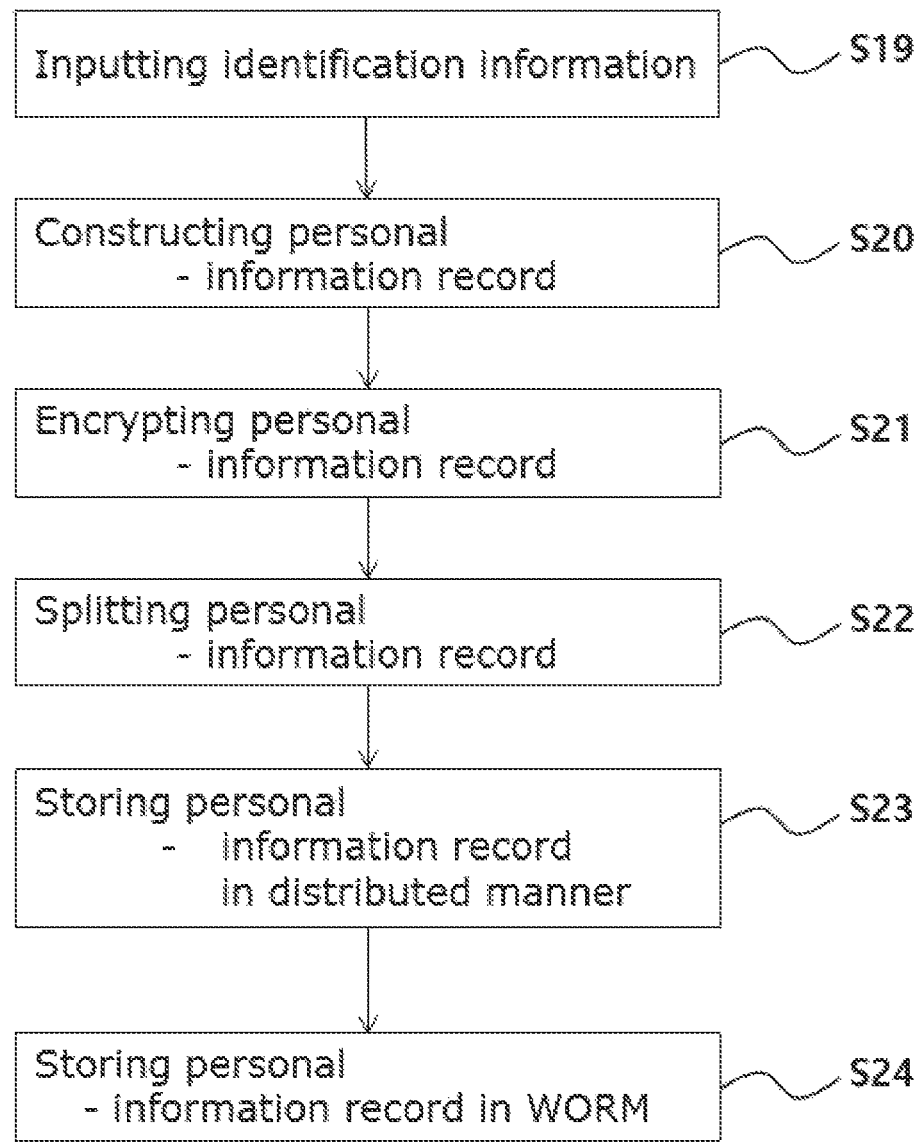
FIG. 6 is a flowchart illustrating a process of preventing hacking into personal information which is performed by an authentication server according to the present disclosure.

Hereinafter, among the functions of the authentication server 30, the function for preventing hacking into personal information will be described with reference to FIG. 6.

The authentication server 30 has a function of storing and managing multiple pieces of identification information (that is, first identification information) unique to an IoT device 20, and multiple pieces of identification information (that is, second identification information) unique to a user terminal 10. In the meantime, the authentication server 30 may also store and manage multiple pieces of identification information (that is, third identification information) unique to a user.

Specifically, the authentication server 30 receives the first identification information and the second identification information from the user terminal 10 or the IoT device and constructs a personal-information record at step S20. In the meantime, the authentication server 30 may receive the third identification information to construct the personal-information record. Therefore, the term "personal-information record" referred to in the present disclosure may refer to a record of the above-described identification information (that is, the first, the second, and the third identification information), or may refer to a record including the same.

Herein, the personal-information record refers to an aggregate of data stored in a data field with association. In addition, the "data field" is an item that stores each data. An aggregate of data composed of such fields is called a data table, and several data tables constitute a single database (DB). The number of fields in each data table may vary with each table.

After the personal-information record is constructed, the authentication server 30 encrypts the personal-information record, According to a preferred embodiment, the authentication server 30 encrypts the personal-information record according to an advanced encryption standard algorithm (AES algorithm) at step S21.

For reference, the AES algorithm is an encryption algorithm designed to compensate for the vulnerability of the Data Encryption Standard (DES), which was used as a national standard, and is a symmetric encryption algorithm used as a US standard. Differently from the DES algorithm, the AES algorithm does not have a Feistel cipher and the size of the encryption block is 128 bits. Further, in addition to 128 bits, the size of the block may be expanded into 192 bits, and 256 bits without changing the algorithm.

The authentication server 30 splits the personal-information record into multiple groups at step S22. For example, the authentication server 30 may divide the personal-information record in a binary-splitting or ternary-splitting manner. Herein, splitting is performed according to a byte-based or bit-based shift algorithm.

According to a preferred embodiment, the authentication server 30 splits, as a first group, a personal-information record corresponding to an odd-number item of a personal-information record, and splits, as a second group, a personal-information record corresponding to an even-numbered item of a personal-information record. For reference, FIG. 7 shows, as an algorithm for binary splitting a record on a per-byte basis, a code for separating a personal-information record into a personal-information record corresponding to an odd-numbered item and a personal-information record corresponding to an even-numbered item.

After splitting of the personal-information record, the authentication server 30 stores the personal-information record of the first group into a first server, stores the personal-information record of the second group into a second server distinguished from the first server, and stores a personal-information record of an N-th group into an N-th server distinguished from the first, the second, and a third server at step S23, Accordingly, the personal-information records of different groups are stored in different servers in a distributed manner. Therefore, even if some servers are hacked, decryption is impossible and it is impossible to identify the personal information, thereby greatly improving the security of the IoT device 20.

In preparation for inoperability of the authentication server caused by hacking and for restoration, the authentication server 30 records the above-described personal-information records on a write-once-read-many (WORM) disk for backup at step S24. In this case, preferably, the personal-information record of the first group is recorded on a first WORM disk, the personal-information record of the second group is recorded on a second WORM disk distinguished from the first WORM disk, and the personal-information record of the N-th group is recorded on an N-th WORM disk distinguished from the first and the second WORM disk.

A WORM disk is a large-capacity standard network storage based on a hard disk, and once stored data is unable to be deleted, forged and falsified even with an administrator's authority. The write-once-read-many (WORM) disk can recode data only once, but the recorded data can be read countless times.

Hereinafter, a method for blockchain-based multi-factor security authentication between a mobile terminal and an IoT device according to the present disclosure will be described. For reference, details and formations of each performer (for example, a user terminal, an IoT device, an authentication server, or the like) that performs each step of the method for multi-factor security authentication, which will be described later, are the same as those described above, so a detailed description thereof will be omitted.

According to the present disclosure, the method for blockchain-based multi-factor security authentication between the mobile terminal and the IoT device schematically includes a registration hash value generation and registration step, and an IoT device control request/approval step.

(1) Registration Step

The registration step is a procedure of recording and storing, in the blockchain 40, information related to validity authentication of the user terminal 10.

Figure 2:
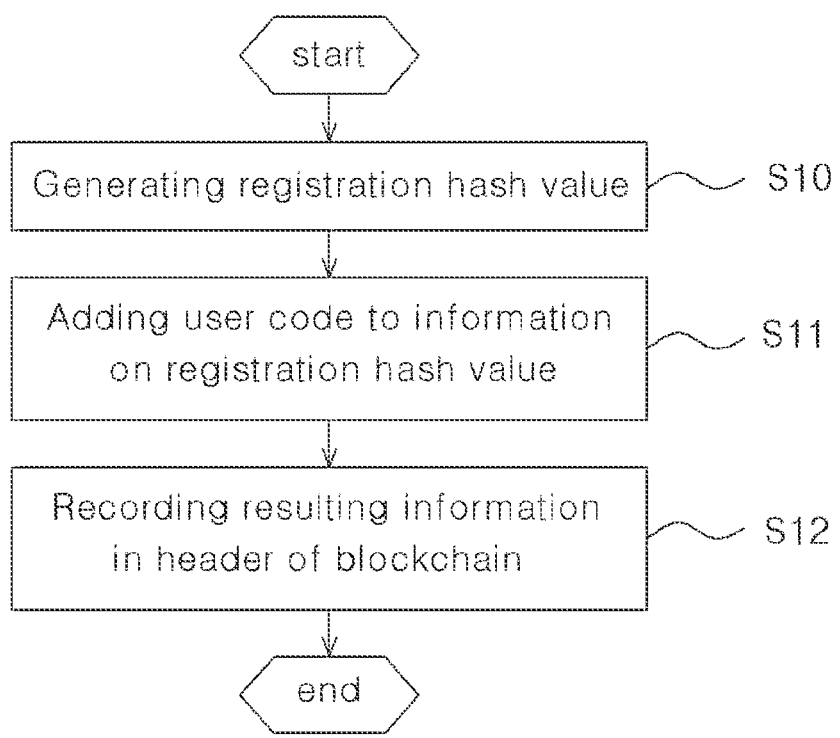
FIG. 2 is a flowchart illustrating a registration process of a registration step according to the present disclosure.

FIG. 2 is a flowchart illustrating a registration process of a registration step according to the present disclosure.

According to the first embodiment, first, the user terminal 10 runs the IoT app or accesses the authentication server 30 to generate a registration hash value at step S10. Alternatively, when the user terminal 10 requests for registration, the authentication server 30 generates a registration hash value.

After the registration hash value is generated, the authentication server 30 records information related to the registration hash value in the blockchain 40, thereby completing the registration process for the registration hash value.

Herein, the "information related to the registration hash value" may be information on the first hash, the second hash, or the third hash, or may be information on the hash that is a mix of at least two among the first hash, the second hash, and the third hash.

Specifically, the "information related to the registration hash value" may include: information (hereinafter, referred to as first combination information) on a combination method of first identification information, which will be described later of the first hash; information (hereinafter, referred to as second combination information) on a combination method of second identification information, which will be described later, of the second hash; information (hereinafter, referred to as third combination information) on a combination method of third identification information, which will be described later, of the third hash; or information (hereinafter, referred to as mixed combination information) on a combination method of the first, the second, and the third identification information of the first and the second mix hash.

In the meantime, the recording of the information related to the registration hash value in the blockchain 40 may further include: adding a user code, which functions as an index value, to the registration hash value at step S11; and recording information related to the registration hash value to which the user code is added in a header of the blockchain 40 at step S12.

After the steps S10 to S12 are completed, the information related to the registration hash value of the user terminal 10 is stored in the blockchain 40 and is used in a validity authentication process for the user terminal 10.

According to the second embodiment, the user terminal 10 may generate the registration hash value by using the first hash, the second hash, or the third hash described above; or may generate the registration hash value by combining the hashes; or may generate the registration hash value by further combining the random number value. In the case where the random number value is further combined to generate the registration hash value, the random number value may be provided from the IoT device 20 or the authentication server 30.

Herein, the user terminal 10 may run the IoT app installed thereon to generate the registration hash value, and may transmit the generated registration hash value to the IoT device 20 or the authentication server 30.

The registration hash value may be directly transmitted to the authentication server 30 by the user terminal 10, or may be provided to the authentication server 30 via the IoT device 20. That is, when the user terminal 10 transmits the registration hash value to the IoT device, the IoT device 20 receives the registration hash value and provides the registration hash value to the authentication server 30.

The authentication server 30 records, in the blockchain 40, the registration hash value received from the user terminal 10 or the IoT device 20, thereby completing the registration process for the registration hash value.

In the meantime, the recording of the registration hash value in the blockchain may further include: adding a user code, which functions as an index value, to the registration hash value, and recording the registration hash value to which the user code is added in a header of the blockchain 40.

After the above-described process, the registration hash value of the user terminal 10 is stored in the blockchain 40 and is used in a validity authentication process for the user terminal 10.

(2) IoT Device Control Request and Approval Step

At the IoT device control request and approval step, the user terminal 10 requests the authentication server 30 to approve control of a particular IoT device 20, and in response to the request, the authentication server 30 verifies the validity of the user terminal 10 and approves remote control of the IoT device 20. Such IoT device control request and approval step may be implemented in various forms.

(2-1) First Embodiment

Figure 3:
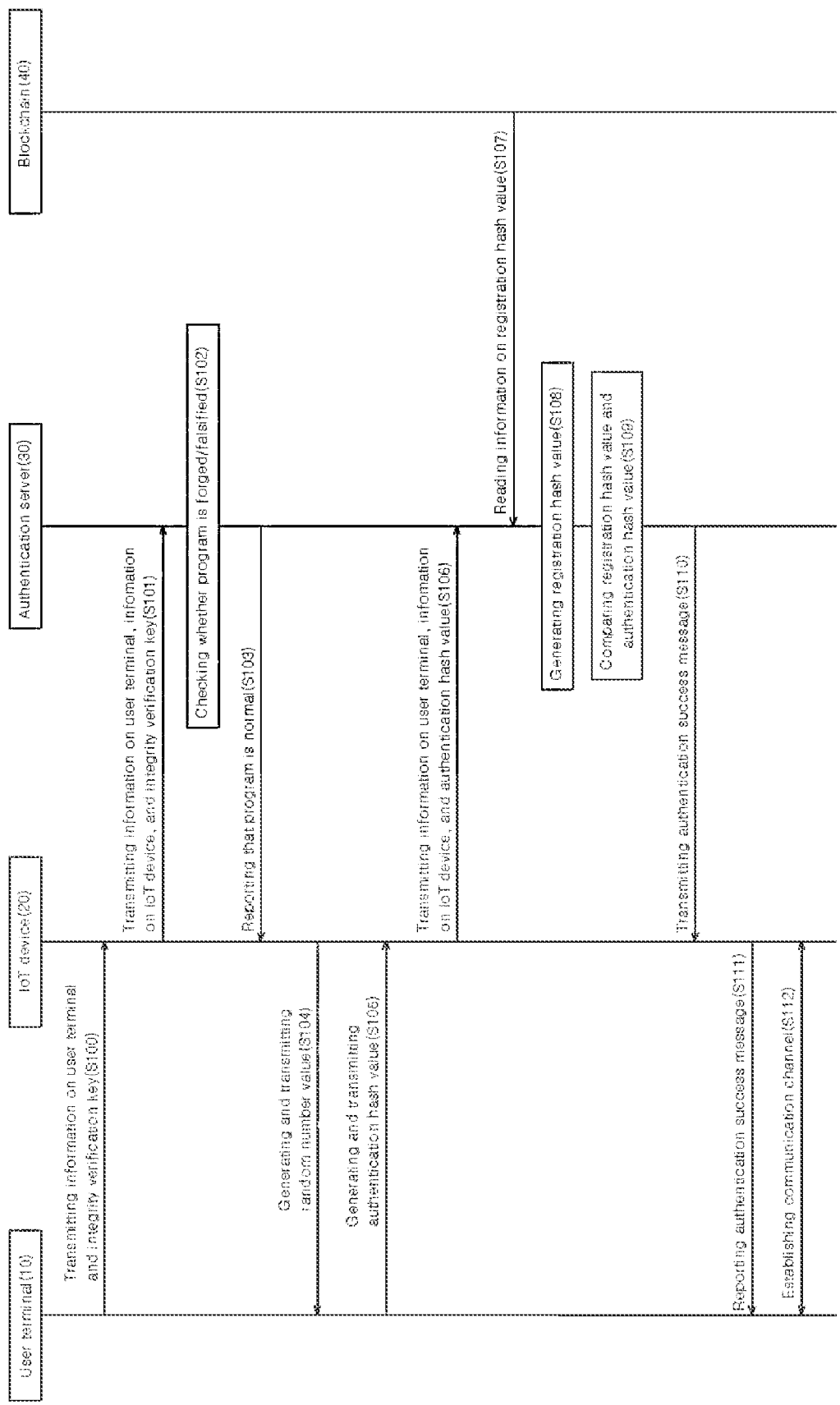
FIG. 3 is a flowchart illustrating a process of requesting and approving control of an IoT device according to a first embodiment of the present disclosure.

FIG. 3 is a flowchart illustrating a process of requesting and approving control of an IoT device according to a first embodiment of the present disclosure.

Referring to FIG. 3, the user terminal 10 runs the IoT app and logs into the IoT device 20. Herein, when logging into the IoT device 20 is not performed normally, the number of failures is counted, proceeding to the first step of applying for authentication takes place, and the authentication process proceeds again from the beginning.

When logging into the IoT device 20 is performed normally, the IoT device 20 approves the login of the user terminal 10. Then, when the login is approved, the user terminal 10 transmits, to the IoT device 20, information on the user terminal 10 and an integrity verification key (for example, version information, a checksum, and the like) of the IoT app installed on the user terminal 10 at step S100.

The IoT device 20 transmits, to the authentication server 30, the information on the user terminal and the integrity verification key that are received from the user terminal 10, and information on the IoT device at step S101.

The authentication server 30 checks the integrity verification key received from the IoT device 20 to identify whether the IoT app of the user terminal 10 is normal, at step S102. Herein, identifying whether the IoT app is normal refer to, for example, checking whether the IoT app is forged/falsified by hacking, or the like. Further, the checking of the integrity verification key may be performed by being compared with the integrity verification key of the IoT app of the user terminal 10 that is pre-registered in a terminal DB for management of the authentication server 30.

As a result of checking the integrity verification key, when the IoT app is abnormal, the authentication server 30 transmits an authentication failure message to the IoT device. Then, the IoT device 20 transmits the received authentication failure message to the user terminal 10.

As a result of checking the integrity verification key, when the IoT app is normal, the authentication server 30 reports that the IoT app of the user terminal 10 is normal, at step S103, Then, the IoT device 20 generates a random number value through a random number generator and transmits the random number value to the user terminal 10 at step S104.

When the random number value is received from the IoT device 20, the user terminal 10 generates an authentication hash value by using the random number value and then transmits the authentication hash value to the IoT device 20 at step S105. Herein, the authentication hash value is an authentication means for verifying the validity of the user terminal 10. As described above, the authentication hash value is a value generated by using a first hash, a second hash, or a third hash, or is a value generated by combining at least two among the first hash, the second hash, and the third hash. Furthermore, the authentication hash value may be a value generated by further combining the random number value.

The IoT device 20 transmits, to the authentication server 30, the authentication hash value received from the user terminal 10, the information on the user terminal, the information on the IoT device at step S106.

When the authentication hash value is received from the IoT device 20, the authentication server 30 generates the registration hash value by using the identification information registered and stored in the DB for management, the random number value generated by the IoT device 20, and the information related to the registration hash value recorded in the blockchain 40, at step S108.

Specifically, when approval for control of the IoT device 20 is requested (that is, when the authentication hash value is received from the IoT device 20), the authentication server 30 reads the information related to the registration hash value recorded in the blockchain 40, namely, the information on the combination method at step S107. Herein, the information on the combination method recorded in the blockchain 40 is the same as that described with reference to FIG. 1.

In addition, according to the combination method corresponding to the information on the combination method read from the blockchain 40, the authentication server 30 combines the first identification information, the second identification information, and (or) the third identification information that are stored in the DB for management in connection with the user terminal 10 and the IoT device 20, thereby generating the registration hash value. In the case of further using the random number value, the registration hash value is generated by further combining the random number value.

Then, the authentication server 30 compares the registration hash value with the authentication hash value generated by the user terminal 10 and determines the validity of the authentication hash value (that is, the validity of the user terminal) at step S109.

As a result of the comparison, when the authentication hash value is different from the registration hash value, the authentication server 30 transmits an authentication failure message to the IoT device 20 and the authentication failure message is transmitted from the IoT device 20 to the user terminal 10, thereby reporting that authentication has failed.

As a result of the comparison, when the authentication hash value is the same as the registration hash value, the authentication server 30 authenticates the user terminal 10 logged into the IoT device 20 as a valid user terminal 10, transmits an authentication success message to the IoT device, and registers a result of the authentication, the information on the authenticated user terminal 10, and the information on the IoT device, at step S110.

Then, when the authentication server 30 transmits the authentication success message to the IoT device 20, the IoT device 20 transmits the message to the user terminal 10, thereby reporting that authentication has succeeded, at step S111.

Then, an encryption communication channel between the user terminal 10 and the IoT device 20 is established so that the user terminal 10 is able to remotely control the IoT device 20 at step S112.

(2-2) Second Embodiment

Figure 4:
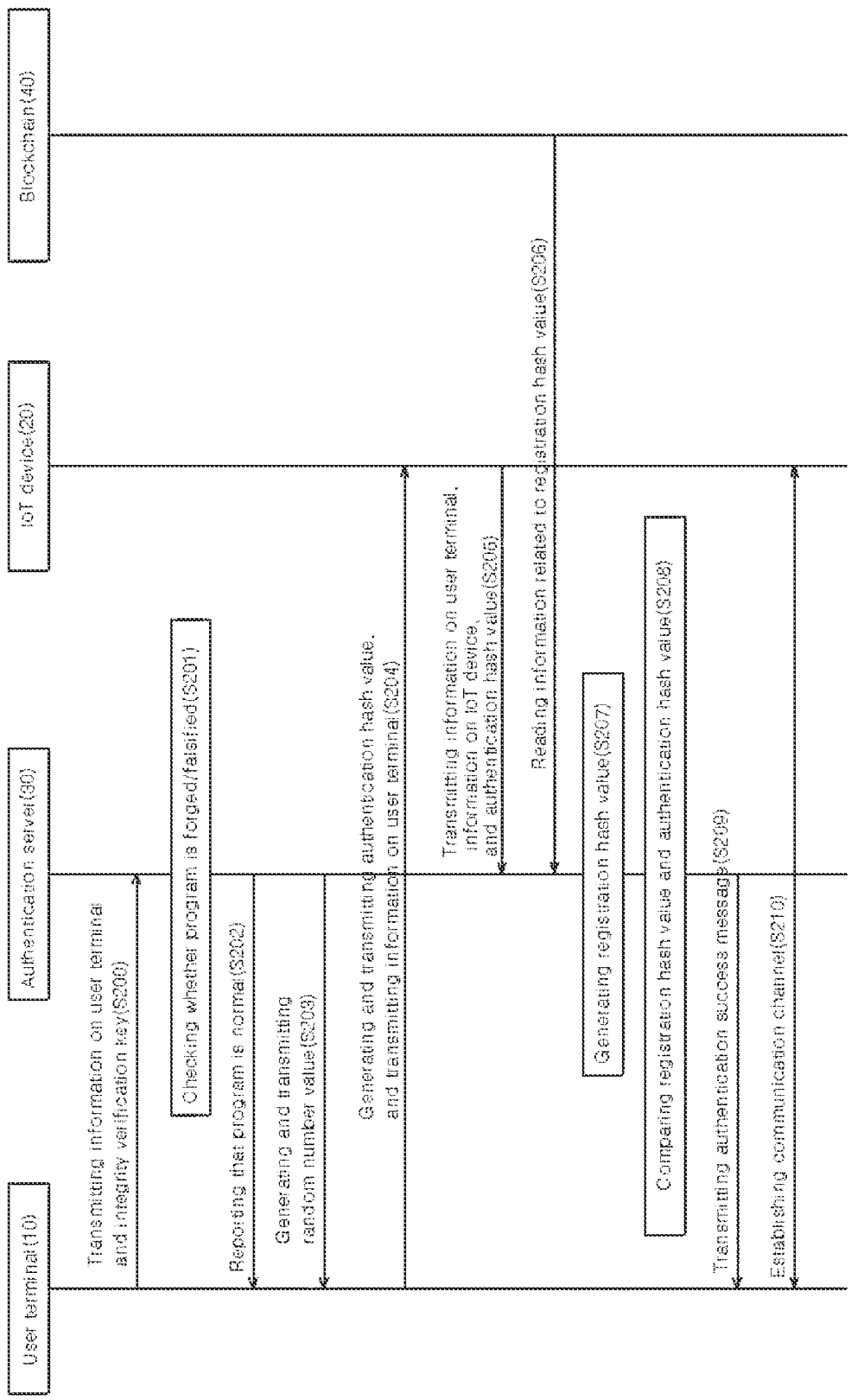
FIG. 4 is a flowchart illustrating a process of requesting and approving control of an IoT device according to a second embodiment of the present disclosure.

FIG. 4 is a flowchart illustrating a process of requesting and approving control of an IoT device according to a second embodiment of the present disclosure.

Referring to FIG. 4, the user terminal 10 runs the IoT app and logs into the authentication server 30, Herein, when logging into the authentication server 30 is not performed normally, the number of failures is counted, proceeding to the first step of applying for authentication takes place, and the authentication process proceeds again from the beginning.

When logging into the authentication server 30 is performed normally, the authentication server 30 approves the login of the user terminal 10, Then, when the login is approved, the user terminal 10 transmits, to the authentication server 30, information on the user terminal 10 and an integrity verification key (for example, version information, a checksum, and the like) of the IoT app installed on the user terminal 10 at step S200.

The authentication server 30 checks the integrity verification key received from the user terminal 10 to identify whether the IoT app of the user terminal 10 is normal at step S201. Herein, identifying whether the IoT app is normal refer to, for example, checking whether the IoT app is forged/falsified by hacking, or the like. Further, the checking of the integrity verification key may be performed by being compared with the integrity verification key of the IoT app of the user terminal 10 that is pre-registered in a terminal DB for management of the authentication server 30.

As a result of checking the integrity verification key, when the IoT app is abnormal, the authentication server 30 transmits an authentication failure message to the user terminal 10.

As a result of checking the integrity verification key, when the IoT app is normal, the authentication server 30 reports that the user terminal 10 is normal, at step S202. Then, the authentication server 30 generates a random number value through a random number generator and transmits the random number value to the user terminal 10 at step S203.

When the random number value is received from the authentication server 30, the user terminal 10 generates an authentication hash value by using the random number value and then transmits the authentication hash value and the information on the user terminal 10 to the IoT device 20 at step S204.

The IoT device 20 transmits, to the authentication server 30, the authentication hash value received from the user terminal 10, the information on the user terminal, the information on the IoT device at step S205.

When the authentication hash value is received from the IoT device 20, the authentication server 30 generates the registration hash value by using the identification information registered and stored in the DB for management, the random number value generated by the IoT device 20, and the information related to the registration hash value recorded in the blockchain 40, at step S207.

Specifically, when approval for control of the IoT device 20 is requested (that is, when the authentication hash value is received from the IoT device 20), the authentication server 30 reads the information related to the registration hash value recorded in the blockchain 40, namely, the information on the combination method at step S206. Herein, the information on the combination method recorded in the blockchain 40 is the same as that described with reference to FIG. 1.

In addition, according to the combination method corresponding to the information on the combination method read from the blockchain 40, the authentication server 30 combines the first identification information, the second identification information, and (or) the third identification information that are stored in the DB for management in connection with the user terminal 10 and the IoT device 20, thereby generating the registration hash value. In the case of further using the random number value, the registration hash value is generated by further combining the random number value.

Then, the authentication server 30 compares the registration hash value with the authentication hash value generated by the user terminal 10 and determines the validity of the authentication hash value (that is, the validity of the user terminal) at step S268.

As a result of the comparison, when the authentication hash value is different from the registration hash value, the authentication server 30 transmits an authentication failure message to the user terminal 10, thereby reporting that authentication has failed.

As a result of the comparison, when the authentication hash value is the same as the registration hash value, the authentication server 30 authenticates the user terminal 10 as a valid user terminal, transmits an authentication success message to the user terminal 10 so as to report that authentication has succeeded, and registers a result of the authentication, the information on the authenticated user terminal 10, and the information on the IoT device, at step S209.

Then, an encryption communication channel between the user terminal 10 and the IoT device 20 is established so that the user terminal 10 is able to remotely control the IoT device 20 at step S210.

(2-3) Third Embodiment

Figure 5:
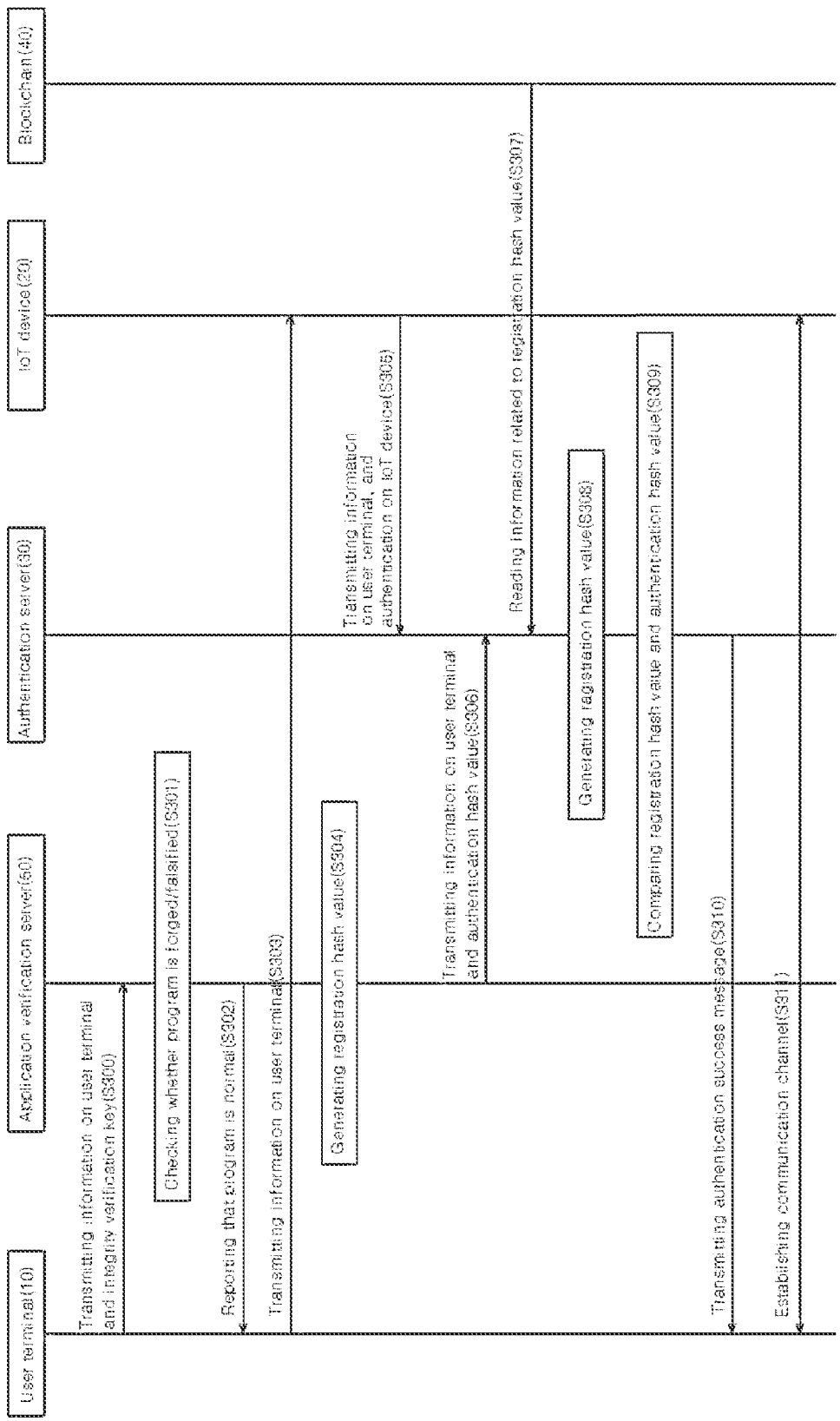
FIG. 5 is a flowchart illustrating a process of requesting and approving control of an IoT device according to a third embodiment of the present disclosure.

FIG. 5 is a flowchart illustrating a process of requesting and approving control of an IoT device according to a third embodiment of the present disclosure.

Referring to FIG. 5, the user terminal 10 runs the IoT app and logs into an application verification server 50. Herein, when logging into the application verification server 50 is not performed normally, the number of failures is counted, proceeding to the first step of applying for authentication takes place, and the authentication process proceeds again from the beginning.

When logging into the application verification server 50 is performed normally, the application verification server 50 approves the login of the user terminal 10. Then, when the login is approved, the user terminal 10 transmits, to the application verification server 50, information on the user terminal and an integrity verification key (for example, version information, a checksum, and the like) of the IoT app installed on the user terminal at step S300.

The application verification server 50 checks the integrity verification key received from the user terminal 10 to identify whether the IoT app of the user terminal 10 is normal, at step S301.

As a result of checking the integrity verification key, when the IoT app is abnormal, the application verification server 50 transmits an authentication failure message to the user terminal 10.

As a result of checking the integrity verification key, when the IoT app is normal, the application verification server 50 reports that the user terminal 10 is normal, at step S302. Then, the application verification server 50 generates a random number value and generates an authentication hash value by using the random number value at step S304.

In the meantime, when it is reported from the application verification server 50 that the IoT app is normal, the user terminal 10 transmits the information on the user terminal 10 to the IoT device 20 at step S303. Then, the IoT device 20 transmits, to the authentication server 30, the information on the user terminal received from the user terminal 10 and information on the IoT device at step S305.

The application verification server 50 transmits, to the authentication server 30, the information on the user terminal 10 and the authentication hash value at step S306. Then, the authentication server 30 generates the registration hash value by using the identification information registered and stored in the DB for management, the random number value generated by the application verification server 50, and the information related to the registration hash value recorded in the blockchain 40, at step S308.

Specifically, when approval for control of the IoT device 20 is requested (that is, when the authentication hash value is received from the application verification server 50), the authentication server 30 reads the information related to the registration hash value recorded in the blockchain 40, namely, the information on the combination method at step S307. Herein, the information on the combination method recorded in the blockchain 40 is the same as that described with reference to FIG. 1.

In addition, according to the combination method corresponding to the information on the combination method read from the blockchain 40, the authentication server 30 combines the first identification information, the second identification information, and (or) the third identification information that are stored in the DB for management, thereby generating the registration hash value. In the case of further using the random number value, the registration hash value is generated by further combining the random number value.

In addition, according to the combination method corresponding to the information on the combination method read from the blockchain 40, the authentication server 30 combines the first identification information, the second identification information, and (or) the third identification information that are stored in the DB for management in connection with the user terminal 10 and the IoT device 20, thereby generating the registration hash value. In the case of further using the random number value, the registration hash value is generated by further combining the random number value.

Then, the authentication server 30 compares the authentication hash value and the registration hash value and determines the validity of the authentication hash value that is, the validity of the user terminal) at step S309.

As a result of the comparison, when the authentication hash value is different from the registration hash value, the authentication server 30 transmits an authentication failure message to the user terminal 10, thereby reporting that authentication has failed.

As a result of the comparison, when the authentication hash value is the same as the registration hash value, the authentication server 30 authenticates the user terminal 10 as a valid user terminal, transmits an authentication success message to the user terminal 10 so as to report that authentication has succeeded, and registers a result of the authentication, the intonation on the authenticated user terminal 10, and the information on the IoT device, at step S310.

Then, an encryption communication channel between the user terminal 10 and the IoT device 20 is established so that the user terminal 10 is able to remotely control the IoT device 20 at step S311.

Although the preferred embodiments of the present disclosure have been described and illustrated using particular terms, the terms are only for clarifying the present disclosure. It is obvious that the embodiments and the terms of the present disclosure may be changed and modified without departing from the technical idea and scope of the following claims. The modified embodiments should not be individually understood from the idea and scope of the present disclosure, and should be said to fall within the scope of the present disclosure.

What is claimed is:

1. A system for blockchain-based multi-factor security authentication between a mobile terminal and an IoT device, the system comprising:
the IoT device;
a user terminal remotely controlling operation of the IoT device; and
an authentication server approving control of the IoT device by the user terminal,
wherein the authentication server includes a processor and a computer-readable non-transitory memory, the computer-readable non-transitory memory storing functions that are executable by the processor, the functions including:
a first function of recording information related to a registration hash value in a blockchain;
a second function of receiving an authentication hash value generated by the user terminal when approval for control of the IoT device is requested, and determining validity of the authentication hash value by using the information related to the registration hash value recorded in the blockchain; and
a third function of approving control of the IoT device by the user terminal when the authentication hash value has validity as a result of the determination,
wherein the information related to the registration hash value is information on a first hash, information on a second hash, or information on a hash (hereinafter, referred to as a mix hash) that is a mix of the first hash and the second hash,
wherein the first hash comprises at least two pieces of identification information among multiple pieces of identification information unique to the IoT device, which is referred to as first identification information, and
wherein the second hash comprises at least two pieces of identification information among multiple pieces of identification information unique to the user terminal, which is referred to as second identification information,
wherein the authentication server further has a fourth function of receiving the first identification information and the second identification information and storing the first identification information and the second identification information in a DB for management,
wherein the information related to the registration hash value is information (hereinafter, referred to as first combination information) on a combination method of the first identification information of the first hash, information (hereinafter, referred to as second combination information) on a combination method of the second identification information of the second hash, or information (hereinafter, referred to as mixed combination information) on a combination method of the first and the second identification information of the mix hash,
wherein the second function has:
a 2-1 function of reading, when approval for control of the IoT device is requested, the first combination information, the second combination information, or the mixed combination information that are recorded in the blockchain;
a 2-2 function of generating the registration hash value by combining the first identification information and the second identification information stored in the DB for management depending on the combination method corresponding to the combination information read according to the 2-1 function; and
a 2-3 function of comparing the authentication hash value and the registration hash value generated according to the 2-2 function so as to determine the validity, and
wherein the third function is to approve control of the IoT device by the user terminal when the authentication hash value is the same as the registration hash value as a result of the comparison.

2. The system of claim 1, wherein the fourth function includes:
a first process of receiving the first identification information and the second identification information and constructing a personal-information record;
a second process of encrypting the personal-information record;
a third process of splitting the personal-information record into multiple groups; and
a fourth process of separately storing a personal-information record of a first group into a first server and storing a personal-information record of a second group into a second server distinguished from the first server.

3. The system of claim 2, wherein the second process is to encrypt the personal-information record according to an AES algorithm.

4. The system of claim 2, wherein the third process is to
split, as the first group, the personal-information record corresponding to an odd-numbered item of the personal-information record, and
split, as the second group, the personal-information record corresponding to an even-numbered item of the personal-information record.

5. The system of claim 2, wherein the fourth process is to separately store a personal-information record of an N-th group into an N-th server distinguished from the first and the second server.

6. The system of claim 2, wherein the fourth function further includes a fifth process of recording the personal-information record of the first group on a first WORM disk and of recording the personal-information record of the second group on a second WORM disk distinguished from the first WORM disk.

7. The system of claim 2, wherein the personal-information record is a record of the first and the second identification information.

8. The system of claim 2, wherein the third process is to split the personal-information record on a per-byte basis or on a per-bit basis.

9. The system of claim 2, wherein the information related to the registration hash value is information on the first hash, the second hash, or a third hash, or information on a hash that is a mix of at least two among the first hash, the second hash, and the third hash,
wherein the third hash comprises at least two pieces of identification information among multiple pieces of identification information unique to a user who owns the user terminal, which is referred to as third identification information, and
wherein the first process of the fourth function is to receive the first identification information, the second identification information, and the third identification information so as to construct the personal-information record.

* * * * *